(12) United States Patent
Seitz et al.

(10) Patent No.: US 10,024,652 B2
(45) Date of Patent: Jul. 17, 2018

(54) LIGHTING CONTROL WHEN USING OPTICAL MEASURING DEVICES

(71) Applicant: CARL ZEISS INDUSTRIELLE MESSTECHNIK GMBH, Oberkochen (DE)

(72) Inventors: Dominik Seitz, Schwaebisch Gmuend (DE); David Hoecherl, Aalen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 0 days.

(21) Appl. No.: 15/576,668

(22) PCT Filed: May 19, 2016

(86) PCT No.: PCT/EP2016/061316
§ 371 (c)(1),
(2) Date: Nov. 22, 2017

(87) PCT Pub. No.: WO2016/188866
PCT Pub. Date: Dec. 1, 2016

(65) Prior Publication Data
US 2018/0135966 A1    May 17, 2018

(30) Foreign Application Priority Data
May 27, 2015    (DE) .................. 10 2015 108 389

(51) Int. Cl.
*G01N 21/00* (2006.01)
*G01B 11/00* (2006.01)
*G01B 5/008* (2006.01)

(52) U.S. Cl.
CPC ............ *G01B 11/005* (2013.01); *G01B 5/008* (2013.01)

(58) Field of Classification Search
CPC ........ G01B 5/008; G01B 11/005; G01B 7/008
(Continued)

(56) References Cited

U.S. PATENT DOCUMENTS 9,194,810 B2    11/2015  Schleith et al.
9,350,921 B2    5/2016   Delaney et al.
(Continued)

FOREIGN PATENT DOCUMENTS

DE          69628956 T2      5/2004
DE       102007034689 A1     1/2009
(Continued)

OTHER PUBLICATIONS

International Search Report issued in PCT/EP2016/061316, dated Aug. 8, 2016 (English and German).
(Continued)

*Primary Examiner* — Hina F Ayub
(74) *Attorney, Agent, or Firm* — Harness, Dickey & Pierce, P.L.C.

(57) ABSTRACT

A measuring machine (10), in particular a coordinate measuring machine, has at least one optical sensor (34) for recording an image in an image capturing region (80) during an image recording time period (86), a control signal transducer (89) which provides a control signal that represents the image recording time period (86), a measurement illumination arrangement (96) for illuminating the image capturing region (80), and a control device (19). The control device (19) is configured to switch on the measurement illumination arrangement (96) during the image recording time period (86) in a manner dependent on the control signal. The control device is further configured to switch on at least one further illumination arrangement (97, 98, 100, 102) temporally outside of the image recording time period (86) in a manner dependent on the control signal. A corre-
(Continued)

sponding measurement system and method for controlling the illumination are also discussed.

5 Claims, 5 Drawing Sheets

(58) Field of Classification Search
USPC .................................................... 356/237.1
See application file for complete search history.

(56) References Cited

U.S. PATENT DOCUMENTS

| 9,417,123 | B2 | 8/2016 | Yoshida et al. |
|---|---|---|---|
| 2003/0067613 | A1 | 4/2003 | Ishikawa et al. |
| 2004/0075841 | A1 | 4/2004 | Van Neste et al. |
| 2005/0177339 | A1 | 8/2005 | Kuhn |
| 2009/0079972 | A1 | 3/2009 | Schleith et al. |
| 2014/0043610 | A1 | 2/2014 | Engel et al. |
| 2014/0152794 | A1 | 6/2014 | Takahashi |
| 2015/0222801 | A1 | 8/2015 | Kresser |
| 2015/0296184 | A1 | 10/2015 | Lindenberg et al. |

FOREIGN PATENT DOCUMENTS

| DE | 102007037812 A1 | 2/2009 |
|---|---|---|
| DE | 202008012677 A2 | 2/2010 |
| DE | 102008048776 A1 | 3/2010 |
| DE | 10-2012-221374 A | 5/2014 |
| DE | 102014208424 A1 | 11/2014 |
| DE | 102014209471 A1 | 12/2014 |
| EP | 2078923 A1 | 7/2009 |
| WO | WO-2009007130 A1 | 1/2009 |
| WO | WO-2015097476 A2 | 7/2015 |

OTHER PUBLICATIONS

International Preliminary Report on Patentability (Chapter II of the Patent Cooperation Treaty) issued in PCT/EP2016/061316, dated Sep. 21, 2017 (in German).
German Examination Report issued in the German priority application DE 10 2015 108 389.2, dated Aug. 4, 2016 (English Language Translation attached); 18 pages.
German Examination Report issued in corresponding application DE 10 2016 106 374.6 (English langauge translation attached); dated Nov. 25, 2016; 16 pp.
Praktischer Einsatz von LED-Beleuchtungssteuerungen in Bildverarbeitungssystemen; Gardasoft Industrial LED technology; 2014; 15 pp.
https://www.zeiss.com/metrology/products/systems/process-control-and-inspection/surfmax.html.
https://www.youtube.com/watch?v=HGre9h8KauU.
International Preliminary Report on Patentability (Chapter II of the Patent Cooperation Treaty) issued in PCT/EP2016/061316 (German with English Translation), dated Nov. 30, 2017); IPEA/EP.

LIGHTING CONTROL WHEN USING OPTICAL MEASURING DEVICES

CROSS-REFERENCE TO RELATED APPLICATIONS

The present application is a National Phase application of international PCT application No. PCT/EP2016/061316, pursuant to 35 U.S.C. § 371, filed on May 19, 2016 designating the U.S., which international patent application has been published in German and claims priority from German patent application DE 10 2015 108 389.2, filed on May 27, 2015. The entire contents of these prior applications are incorporated herein by reference.

The present invention relates to a measuring machine, in particular a coordinate measuring machine, comprising at least one optical sensor for recording an image in an image capturing region during an image recording time period, a control signal transducer which provides a control signal that represents the image recording time period, a measurement illumination arrangement for illuminating the image capturing region, and comprising a control device. Moreover, the present invention relates to a method for controlling the illumination for a measuring machine comprising at least one optical sensor for recording an image in an image capturing region.

Coordinate measuring machines are well known in the prior art. They are used to check workpieces, for example as part of quality assurance, or to determine the geometry of a workpiece completely as part of what is known as "reverse engineering". Moreover, multifarious further application possibilities are conceivable.

In coordinate measuring machines of this type, different types of sensors may be used to capture the coordinates of a workpiece to be measured. By way of example, sensors that measure in tactile fashion are known in this respect, as are sold, for example, by the applicant under the product designation "VAST", "VAST XT" or "VAST XXT". Here, the surface of the workpiece to be measured is probed with a stylus, the coordinates of said stylus in the measurement space being known at all times. Such a stylus may also be moved along the surface of a workpiece, such that a multiplicity of measurement points may be captured at set time intervals during such a measuring process within the scope of what is known as a "scanning method".

Furthermore, it is known practice to use optical sensors that facilitate contactless capturing of the coordinates of a workpiece. One example of such an optical sensor is the optical sensor sold by the applicant under the product designation "ViScan".

The sensors may then be used in different types of measurement constructions. One example of such a measurement construction is the product "O-INSPECT" by the applicant. In an appliance of this type, both an optical sensor and a tactile sensor are used to carry out various examination tasks on a machine and ideally with a single setup of a workpiece to be measured.

Sensor systems comprising optical sensors are becoming increasingly more important in coordinate metrology. Here, optical sensors are distinguished, in particular, by a high speed of the measuring process. In this way it is possible to carry out many examination tasks, for example in medical engineering, plastics technology, electronics and precision engineering. Various other constructions are, of course, also conceivable.

Conventionally, the optical sensor head or the optical sensor is connected to a carrier system which supports and moves the optical sensor system. Various carrier systems are known from the prior art, for example portal systems, stand systems, horizontal arm systems and arm systems, and all types of robotic systems. Here, the carrier systems may moreover comprise system components which facilitate a positioning of the sensor head which is as flexible as possible. An example for this is the articulation from the applicant sold under the name "RDS". Moreover, various adapters for connecting the various system components of the carrier system among themselves and with the sensor system may be provided.

Moreover, it is conventional in coordinate metrology that work may be conducted with different types of illumination when measuring objects. By way of example, provision may be made of reflected light illumination which, for example, may be configured as bright field-dark field illumination. The corresponding optical sensors then comprise a video camera and/or an image camera and appropriate illumination for the workpiece. Moreover, a fixed imaging optical unit is usually provided, said fixed imaging optical unit imaging the workpiece to be measured onto the camera or the optical sensors of the camera. Here, in general, provision is made of specific optical sensors comprising fixedly integrated illuminations and imaging optical units for each application or each type of measurement.

Moreover, the present invention may also find use in other measuring machines, for example microscopes.

When using optical measuring machines, a user wishes—as in the case of tactile measuring machines too—to see the current measurement point or the region captured by the camera, the so-called ROI (region of interest), especially when calibrating a test plan or during individual parts tests. In so doing, the ROI is visualized onto the workpiece to be measured. This can easily be provided in the case of tactile measuring machines since the current position or the current measuring point can be identified by the position of the sensing sphere on the tactile sensor. However, in the case of optical measuring machines, the region currently captured by the optical sensor cannot readily be assigned to an actual position on the workpiece, even if the captured region is presented on a monitor, in most workpieces to be measured, particularly in the case of large magnifications.

Therefore, it is proposed to mark the ROI or the image capturing region by means of e.g. a laser beam. By way of example, the laser beam can be emitted by a light source that is attached to the object to be measured.

However, a bright spot then is visible in the image capturing region if such a laser is used. If the laser is moreover steered through the entire lens or a part thereof, bright speckle patterns emerge on account of reflections at the lens elements. As a consequence, a disadvantage of all of this is that it is not possible to carry out a measurement when marking the image capturing region. This slows down the process of configuring a measuring machine or the measuring of individual components.

Various illumination control methods for optical measuring machines have already been proposed in the prior art; by way of example, document DE 10 2014 208 424 A1 has proposed a method for setting the illumination of an image measuring apparatus, in which a relationship between a brightness guidance value and a current value corresponding to a brightness is calculated on the basis of a previously present relationship between a current flowing through a light-emitting device and the brightness, said method comprising the steps of creating a calibration table containing the brightness guidance value, the current value and the brightness, calculating a required brightness during a measurement, calculating a brightness guidance value corresponding to the required brightness and setting the brightness guidance value using the calibration table.

Moreover, document EP 2 078 923 A1 proposed an image measuring device comprising a camera, which ascertains images of a plurality of measurement points on the basis of a pre-set measurement procedure, and an illumination unit, which illuminates the measurement points.

Moreover, document DE 10 2014 209 471 A1 exhibits a method for controlling a part for generating a structured illumination pattern in order to illuminate a workpiece during image capturing by a camera in a specification image processing inspection system.

However, there remains a need for a measuring machine, a measurement system, and a method for controlling the illumination for a measuring appliance, which remove the disadvantages described above. It is therefore an object of the present invention to specify an improved method for controlling the illumination and a measuring machine, in particular a coordinate measuring machine, comprising at least one optical sensor, which provides an improved marking of an image capturing region.

SUMMARY OF THE PRESENT INVENTION

In accordance with a first aspect of the invention, a measuring machine, in particular a coordinate measuring machine is therefore provided, comprising at least one optical sensor for recording an image in an image capturing region during an image recording time period, a control signal transducer which provides a control signal that represents the image recording time period, a measurement illumination arrangement for illuminating the image capturing region, and a control device, wherein the control device is embodied to switch on the measurement illumination arrangement during the image recording time period in a manner dependent on the control signal and wherein the control device moreover is embodied to switch on at least one further illumination arrangement temporally outside of the image recording time period in a manner dependent on the control signal.

Optical sensors, in particular cameras, which are used in optical metrology offer the option of displaying the current status of the image acquisition by way of so-called "triggers". Below, such a "trigger" is also referred to as control signal transducer. Hence, a subsequent system or the electronics or the control device of the measuring machine knows whether an "image" is currently "taken" by means of the at least one optical sensor. The status of a shutter or a stop is captured and hence whether or not light is collected by means of the at least one optical sensor is forwarded. In this way, measurement illumination arrangements are only switched on when the at least one optical sensor in fact requires light. As a result, a heat influx into the whole system can be kept low.

Now, the invention uses this principle of switching illumination arrangements depending on the control signal in order only to switch on the light sources or illumination arrangements which do not contribute to the measurement illumination during the image capturing time period when no light is collected for the at least one optical sensor, i.e. when no image is taken. This further illumination arrangement, which does not contribute to the measurement illumination, may be, for example, the laser described above or a laser pointer. A further alternative for being able to dispense with a laser illumination device for marking the image capturing region lies in the use of a bright field reflected light illumination device, which is present in many measuring machines in any case. It can be used for marking the image capturing region when other illumination arrangements are used. Due to its structure, the bright field reflected light illumination device illuminates the image capturing region. If the bright field reflected light illumination device is steered completely through the lens, in particular a zoom lens, this moreover provides the advantage that the field that is illuminated by the bright field reflected light illumination device always is as large as the image capturing region of the at least one optical sensor. As a consequence, the image capturing region can also be marked by means of the bright field reflected light illumination device.

Thus, the further illumination arrangement can always remain switched on during e.g. calibration of sequences or test plans, or during a semiautomatic measurement of individual parts, without, however, adversely affecting the measurement accuracy or the measurement results. If the further illumination arrangement can remain switched on apart from the relatively short image recording time periods, the influences of temperature on the overall measuring machine are minimized as in the case of a temperature influence with irregular influences over time can be replaced by a constant temperature influence.

Since the at least one further illumination arrangement is only switched on when the at least one optical sensor does not collect any light, the further illumination arrangement is not captured by the at least one optical sensor, even if it serves for marking the image capturing region, as it is switched off before the image recording time period. As a consequence, the further illumination arrangement cannot influence the image capture. Manually switching on and off a marking light also becomes superfluous.

In principle, e.g. a workshop illumination or an illumination that is arranged at a distance from the measuring machine can also be used as a further illumination arrangement.

Therefore, in accordance with a second aspect of the invention, a measurement system is proposed, said measurement system comprising a measuring machine according to the first aspect of the invention or one of the configurations thereof, wherein the measurement system has the further illumination arrangement, wherein the further illumination arrangement is an ambient illumination arrangement for illuminating surroundings of the measuring machine and wherein the ambient illumination arrangement is arranged at a distance from the measuring machine.

Such an ambient illumination arrangement serves to illuminate the complete working region of the machine for the user in the otherwise e.g. darkened room, in which the measuring machine is arranged, in order thus to grant a view of the workpiece, further sensors such as tactile sensors and the entire remaining construction.

By way of example, measuring machines stand in a temperature-stable room for particularly accurate applications. As a rule, the light is left switched on in such rooms since switching off the ambient light may have an influence on the climactic conditions in the measurement room and hence on the accuracy of the measuring machine. However, in this case too, the ambient illumination arrangement of the measurement room can be switched off during the image recording time period or the at least one image recording time period by means of the invention proposed here. Otherwise, the ambient illumination arrangement can be left switched on such that, despite all of this, a temperature influence remains constant.

In accordance with a third aspect of the invention, a method for controlling the illumination for a measuring machine or for a measurement system comprising at least one optical sensor for recording an image in an image capturing region is proposed, said method comprising the following steps:

setting at least one image recording time period, during which an image recording is effectuated by means of the at least one optical sensor;

providing a control signal which represents the at least one image recording time period;

illuminating the image capturing region using a measurement illumination arrangement of the measuring machine during the image recording time period in a manner dependent on the control signal; and illuminating the image capturing region using a further illumination arrangement temporally outside of the image recording time period in a manner dependent on the control signal.

In accordance with a fourth aspect of the invention, a computer program product, in particular a non-volatile computer program product, is proposed, comprising a computer program having program codes for carrying out a method according to the third aspect of the invention or one of its configurations when the computer program is executed on a measuring machine.

The object stated at the outset is therefore fully achieved.

In one configuration of the measuring machine, provision can be made for the measuring machine to have the further illumination arrangement.

As a consequence, the further illumination arrangement is an illumination arrangement or light source that is provided in the measuring machine. Often, measuring machines with optical sensors have a plurality of illumination arrangements for different measurement methods. Then, the further illumination arrangement can be provided by one of these illumination arrangements that is not required for the image recording. In particular, the further illumination arrangement hence is different from the measurement illumination arrangement. In principle, the measuring machine has at least one further illumination arrangement. As a consequence, one of these at least one further illumination arrangements can have the measuring machine. However, alternatively, or cumulatively, it is also possible that the measuring machine is only embodied for actuating one of the at least one further illumination arrangement that is not part of the measuring machine. By way of example, this can be an ambient illumination arrangement.

In accordance with a further configuration of the measuring machine, provision may be made for the further illumination arrangement to be a marking illumination device for marking the image capturing region.

In this way, the image capturing region can be marked for the user outside of the image recording time period, in particular be marked on a workpiece to be measured.

In a further configuration of the measuring machine, provision can be made for the measuring machine to have a lens and wherein an image recording of the at least one optical sensor is effectuated through the lens. In particular, provision can be made here for the lens to be a zoom lens.

In this way, an image capturing region of the at least one optical sensor can be varied in terms of the size thereof.

In a further configuration of the measuring machine, provision can be made for one of the at least one optical sensor to be a camera. In a further configuration of the measuring machine, provision can be made for provision to be made of exactly one optical sensor, wherein the optical sensor is a camera.

This renders it possible to capture image recording sequences that consist of a plurality of individual images. Here, the individual images can be recorded at a certain frequency, as a result of which a cycle duration of the image recording emerges.

In a further configuration of the measuring machine, provision may be made for the further illumination arrangement to be a bright field reflected light illumination device. Expressed differently, the illumination arrangement of the at least one further illumination arrangement is a bright field reflected light illumination device.

In this way, a bright field reflected light illumination device which is provided in the measuring machine but not required for a specific measurement process can be used for marking an image capturing region. In this way, the image capturing region of the at least one optical sensor is illuminated by the bright field reflected light illumination device, particularly if the bright field reflected light illumination device is guided through the whole lens, in particular a zoom lens, such that the illumination beam path of the bright field reflected light illumination device extends completely through the lens, in particular the zoom lens.

In a further configuration, provision may be made for the further illumination arrangement to be a laser for marking the image capturing region.

In this way, the image capturing region may be marked by means of a laser or a laser pointer. As a rule, on account of the good visibility, a laser is particularly suitable for marking the image capturing region on all types of workpieces.

In a further configuration, provision can be made for the laser to be arranged in such a way that a marking beam path of the laser extends outside of the lens.

In particular, provision can be made, for example, for the laser to be arranged laterally on the lens and therefore be able to radiate directly onto the workpiece.

In a further configuration, provision can be made for a marking beam path of the laser to be coupled into the lens by means of an optical coupling element. In this way, the marking beam path can be guided through at least some of the lens or the entire lens. In this way, it is possible to let the marking beam path extend coaxially with the optical axis of the lens.

In a further configuration of the method, provision may be made for the illumination with the further illumination arrangement to start offset by a first time duration after an end of the at least one image recording time period.

Depending on the image recording frequency of a camera, the image recording time period can be set with a specific time duration. A time period between the end of an image recording time period and the start of the subsequent image recording time period is known on account of the known cycle duration on the basis of the image recording frequency of the camera. The illumination by means of the further illumination arrangement can now be effectuated herewith outside of the image recording time period. Here, the start of the switch-on of the further illumination device may start offset by a time period after the end of the image recording time period. In this way, it is possible to ensure that the further illumination arrangement does not "illuminate into" the image recording.

In a further configuration, provision may be made for the illumination with the further illumination arrangement to end offset by a second time duration before the start of the at least one image recording time period.

In this way, it is once again possible to specify that the second illumination arrangement does not illuminate into the image recording time period. Persistence of the further illumination arrangement is avoided. This occurs by virtue of the second time duration being set to have a sufficient length.

In a further configuration of the method, provision can be made for the first time duration and/or the second time duration to have a length of at least 0.5 milliseconds and of at most 2 milliseconds. In particular, the length of the first time duration and/or the second time duration can be 1 millisecond.

These values were found to be practical to avoid that the further illumination arrangement illuminates into the image recording.

In a further configuration, provision can be made for a plurality of image recording time periods to be set, wherein the respective starts of successive image recording time periods are spaced apart in time by one cycle duration.

In this way, a cycle duration of the respective starts of successive image recording time periods emerges from an image recording frequency of the at least one optical sensor. Then, the length of the image recording time period or else the first time duration and/or the second time duration can be set e.g. dependent on the cycle duration. The respective start thereof can also be set depending on the start of the cycle duration or of the image recording time period.

In a further configuration, provision may be made for the length of the image recording time period to be less than 20% of the cycle duration. In particular, provision can also be made for the length of the image recording time period to be less than 25% or less than 15% of the cycle duration.

In a further configuration, provision can be made for a length of a switch on time period of the further illumination arrangement, or of the at least one further illumination arrangement, outside of the image recording time period to be less than 67% of the length of the cycle duration.

In this way, the remaining duration of 33% of the cycle duration can be used for the image recording time period and the first time duration and/or the second time duration.

In principle, provision can be made in all configurations of the measuring machine or of the method for provision to be made of exactly one further illumination arrangement. However, provision can also be made for provision to be made of more than one further illumination arrangement. By way of example, provision can be made for provision to be made of two further illumination arrangements or three further illumination arrangements.

If there is a change in the iteration time of the camera, i.e. of the image recording time period, it is possible that there is a change in brightness of the marking illumination or of an ambient illumination. Under certain circumstances, this is unwanted and can be improved with fixed time duration depending on the cycle duration of the at least one optical sensor.

As a rule, an optical sensor is operated with a maximum possible integration time. A duration of e.g. 5 milliseconds was found for this in practice. This ensures that, for example, a camera as an optical sensor can always be operated at 30 Hz. By implication, this means that a new image is captured every 33.3 milliseconds. As a consequence, the starts of successive image recording time periods are offset by 33.3 milliseconds from one another. Expressed differently, the marking illumination device or the ambient illumination arrangement, i.e. the at least one further illumination arrangement, is switched off for at most 5 milliseconds every 33.3 milliseconds so as not to influence a measurement.

Building hereon, the further illumination arrangement can start after fixed time interval, for example 6 milliseconds, expressed differently with an interval equalling the first time duration, from the end of the image recording time period or the maximum image recording time period, for example 6 milliseconds after the start of the image recording time period or the start of a cycle duration. Then, the further illumination arrangement can remain switched on for e.g. 20 milliseconds. In this way, a length of approximately 7.3 milliseconds still emerges for the second time duration, and so a persistence of the marking illumination or of the ambient illumination arrangement does not occur in the next image recording time period.

It is understood that the features specified in conjunction with the method can also find use in the measuring machine or the measurement system according to the invention, or in the computer program product according to the invention. Conversely, the features listed for the measuring machine, the measurement system or the computer program product may find use in the method according to the invention.

It goes without saying that the aforementioned features and those yet to be explained below can be used not only in the combination specified in each case but also in other combinations or on their own, without departing from the scope of the present invention.

BRIEF DESCRIPTION OF THE DRAWINGS

Embodiments of the invention are shown in the drawing and explained in more detail in the following description. In the Figures.

DETAILED DESCRIPTION OF THE PREFERRED EMBODIMENTS

Figure 1:
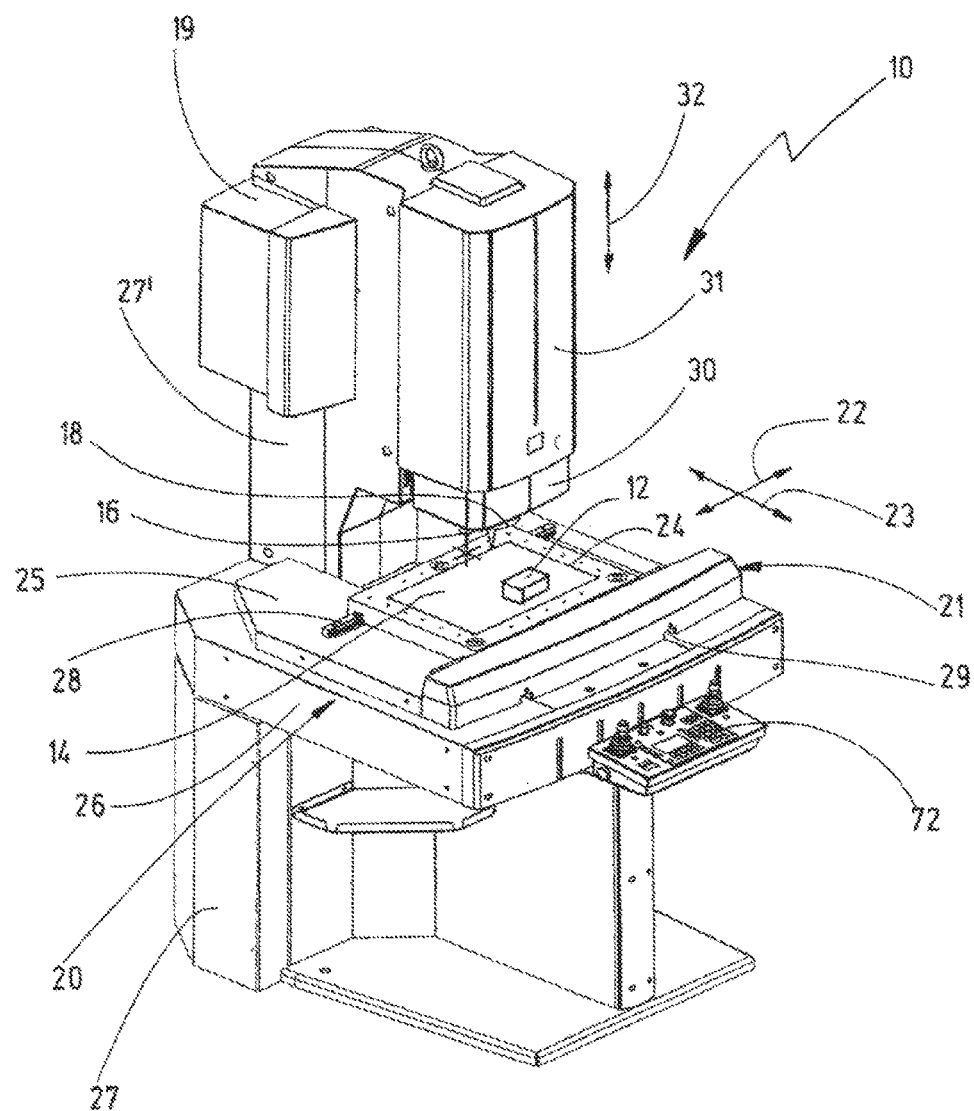
FIG. 1 shows a schematic illustration of a measuring machine.

FIG. 1 shows a measuring machine 10 for inspecting an object 12 to be measured, said object being arranged on a workpiece holder 14. The measuring machine 10 is a coordinate measuring machine in the depicted embodiment. The object 12 to be measured is measured by means of one or more optical sensors 18. Optionally, one or more tactile sensors 16 may additionally also be provided.

Coordinate measuring machines are well known in the prior art. They are used to check workpieces, for example as part of quality assurance, or to determine the geometry of a workpiece completely as part of what is known as "reverse engineering". Moreover, multifarious further options for application are conceivable, for example also the additional use for inspecting surfaces.

In coordinate measuring machines of this type, different types of sensors may be used to capture the coordinates of a workpiece to be measured. By way of example, sensors that measure in tactile fashion are known in this respect, as are sold, for example, by the applicant under the product designation "VAST", "VAST XT" or "VAST XXT". Here, the surface of the workpiece to be measured is probed with a stylus, the coordinates of said stylus in the measurement space being known at all times. Such a stylus may also be moved along the surface of a workpiece, such that a multiplicity of measurement points may be captured at set time intervals during such a measuring process within the scope of what is known as a "scanning method".

Furthermore, it is known practice to use optical sensors that facilitate contactless capturing of the coordinates of a workpiece. One example of such an optical sensor is the optical sensor sold by the applicant under the product designation "ViScan".

The sensors may then be used in different types of measurement constructions. An example of such a measurement construction is a table construction, as shown in FIG. 1. One example of such a table construction is the product "O-INSPECT" by the applicant. In an appliance of this type, both an optical sensor and a tactile sensor are used to carry out various examination tasks on a machine and ideally with a single setup of a workpiece to be measured. In this way it is easily possible to carry out many examination tasks, for example in medical engineering, plastics technology, electronics and precision engineering. Various other constructions are, of course, also conceivable.

Such sensor systems or sensor heads, which carry both tactile sensors and optical sensors, find increasing importance in coordinate metrology. A combination of tactile and optical sensors facilitates combining the advantages of the high accuracy of a tactile measurement system with the speed of an optical measurement system in a single coordinate measuring machine. Moreover, calibration processes when changing the sensors are avoided, just like possible rechucking of a workpiece.

Conventionally, the sensor head, which may also be referred to as a sensor system, is connected to a carrier system which supports and moves the sensor system. The prior art has disclosed various carrier systems, for example portal systems, stand systems, horizontal arm systems and arm systems, all types of robotic systems and ultimately closed CT systems in the case of sensor systems operating with x-rays. Here, the carrier systems may moreover comprise system components which facilitate a positioning of the sensor head which is as flexible as possible. An example for this is the articulation from the applicant sold under the name "RDS". Moreover, various adapters for connecting the various system components of the carrier system among themselves and with the sensor system may be provided.

As a consequence, the use of the measuring machine 10 or the system 100 is not restricted to the table construction, depicted in FIG. 1, and the corresponding carrier system, but, instead, it may also be used with all other types of carrier system. Furthermore, the measuring machine 10 may also find use, in general, in multi-sensor measurement systems, or else in a material microscope.

The measuring machine 10 furthermore comprises a measurement table 20. Situated on the measurement table 20 is a positioning device 21. Provision is made, in particular, of positioning the object 12 to be measured parallel to an X-axis 22 and to a Y-axis 23. Here, the X-axis 22 and the Y-axis 23 span a measurement plane.

By way of example, an X-table 24 and a Y-table 25 may be provided for positioning purposes. The X-table 24 is movable parallel to the X-axis 21 and the Y-table 25 is movable parallel to the Y-axis 22. Both are arranged on a base plate 26. The base plate 54 is carried by a machine frame 27 and 27'.

The movement of the X-table 24 and of the Y-table 25 is guided by linear guides in the X-direction 28 and by linear guides in the Y-direction 29. This construction corresponds to the so-called "table construction". As explained above, other carrier systems are also conceivable.

The measuring machine 10 furthermore comprises a measuring head 15. One or more tactile sensors 16 may be arranged on the measuring head 15. Furthermore, the measuring machine 10 is arranged on the measuring head 15. Moreover, one or more further optical sensors 18 also can still be arranged at or in the measuring head 16. Thus, the measuring head 15 serves to couple the one or more optical sensors 18 and, possibly, a tactile sensor 16 with a carrier structure, for example a Z-carriage 30. The measuring head 15 may be a closed housing construction, but it may also have an open embodiment. By way of example, the measuring head 15 may also have the form of a simple plate, on which the one or more optical sensors 18, and possibly the tactile sensor 16, are fastened. Moreover, all further possible forms for coupling the one or more optical sensors 18, and possibly the tactile sensor 16, with the carrier structure are also conceivable.

The measuring head 15 is held on the Z-carriage 30 which is guided in a carriage housing 31 parallel to a Z-axis 32. This Z-axis 32 is perpendicular to the X-axis 22 and the Y-axis 23. The X-axis 22, the Y-axis 23 and the Z-axis 32 therefore form a Cartesian coordinate system.

The measuring machine 10 furthermore comprises a control console 33. It is possible to actuate the individual elements of the measuring machine 10 by way of the control console 72. Moreover, it is possible to predetermine inputs to the measuring machine 10. In principle, provision may also be made for a display apparatus (not depicted here) to be arranged in the control console 33 or at a different location for the purposes of directing measurement value outputs to a user of the measuring machine 10. A control device 19 serves to control or regulate the measuring machine 10. In principle, the control device may also be arranged separately and/or at a distance from the measuring machine 10.

Figure 2:
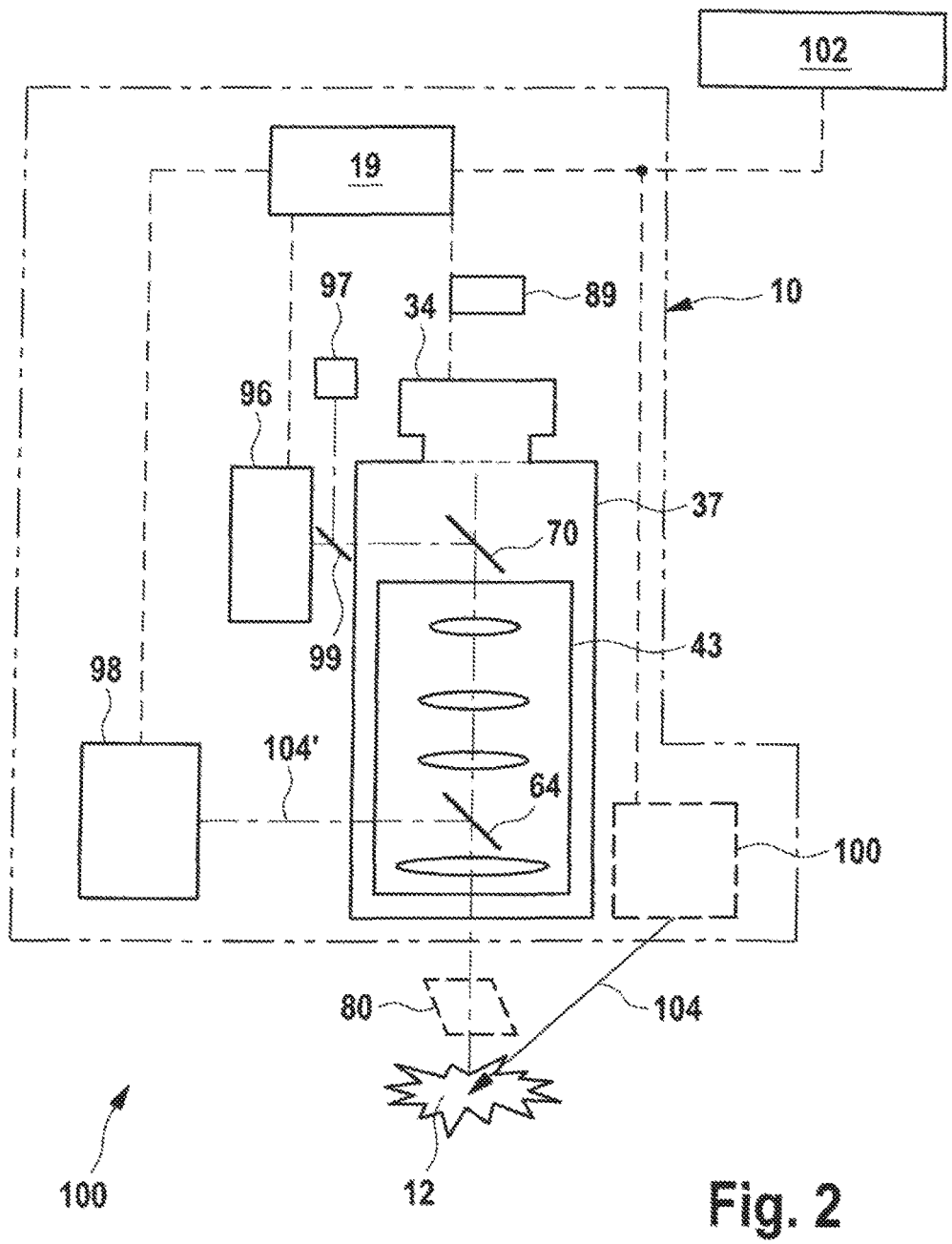
FIG. 2 shows an embodiment of a measurement system and an embodiment of a measuring machine.

FIG. 2 shows an embodiment of a measurement system 100. This measurement system 100 has the measuring machine 10 and, moreover, an ambient illumination arrangement 102 for illuminating surroundings of the measuring machine 10. The ambient illumination arrangement 102 embodies a further illumination arrangement. Further possible further illumination arrangements are denoted by the reference signs 97, 98, and 100, and will still be explained in more detail below. In principle, the control device 19 of the measuring machine 10 is embodied to control at least one further illumination arrangement 97, 98, 100, 102. Here, as in the case of the further illumination arrangements 97, 98, 100, the at least one further illumination arrangement can be an element of the measuring machine 10 itself. However, provision can also be made for the at least one further illumination arrangement to be arranged at a distance from the measuring machine 10, as in the case of the ambient illumination arrangement 102. Then, the further illumination arrangement 102 and the measuring machine 10 form the measurement system 100.

The measuring machine 10 comprises a lens 43. This lens 43 may have e.g. a plurality of lens elements or compound lenses, as is still described in more detail in conjunction with FIG. 3. The lens 43 may be arranged in a housing 37. By way of example, a camera 34 which is connected to the housing 37 and captures an image capturing region 80 on the workpiece 12 through the lens 43 serves as an optical sensor. A control signal transducer is denoted by 89. The latter can capture an image recording time period of the camera 34 and transmit a control signal that represents an image recording time period of the camera 34 to the control device 19. Depending on the control signal, the control device 19 can switch, in particular, the at least one further illumination arrangement 97, 98, 100, 102 and a measurement illumination arrangement 96. This is carried out dependent on the control signal that is provided by the control signal transducer 89. The representation, configuration, and arrangement of the measurement illumination arrangement 96 should merely be understood to be exemplary. The latter is coupled to the lens 43 via a beam splitter or a coupling element 70 and the measurement illumination beam path passes through the whole lens. Here too, in principle, depending on the selected illumination system, there may also be a different arrangement or coupling of the measurement illumination arrangement 96. Moreover, a further illumination arrangement 97 is depicted. By way of example, this can be a bright field reflected light illumination device 97, which can also be used as a marking illumination device in conjunction with a measurement illumination arrangement for a different measurement method. Then, for example, the bright field reflected light illumination device can be coupled via a further beam splitter 99 and can pass through the entire lens 43. As a result, the bright field reflected light illumination device as marking device illuminates the entire image capturing region 80. This then applies in all settings of the lens 43. A measurement illumination arrangement 98, which is coupled to the lens 43 by means of 64, is presented as a further example. Again, this may be a beam splitter in this case. As a consequence, as already explained above, provision can be made of, for example, embodying the further illumination arrangement 98 as a laser and then of coupling a marking beam path 104' of the further illumination arrangement 98 into the beam path of the lens 43 by means of the beam splitter 64. Then, the image capturing region 80 can also be marked in this way. However, it is also possible that e.g. the further illumination arrangement 100 is arranged outside of the lens 43, for example laterally next to the lens 43. In this way, e.g. the further illumination arrangement 100 can likewise be embodied as a laser again and a marking beam path 104 of the laser 100 can then directly mark the image capturing region 80 on the workpiece. The marking beam path 104 then extends outside of the lens 43.

Figure 3:
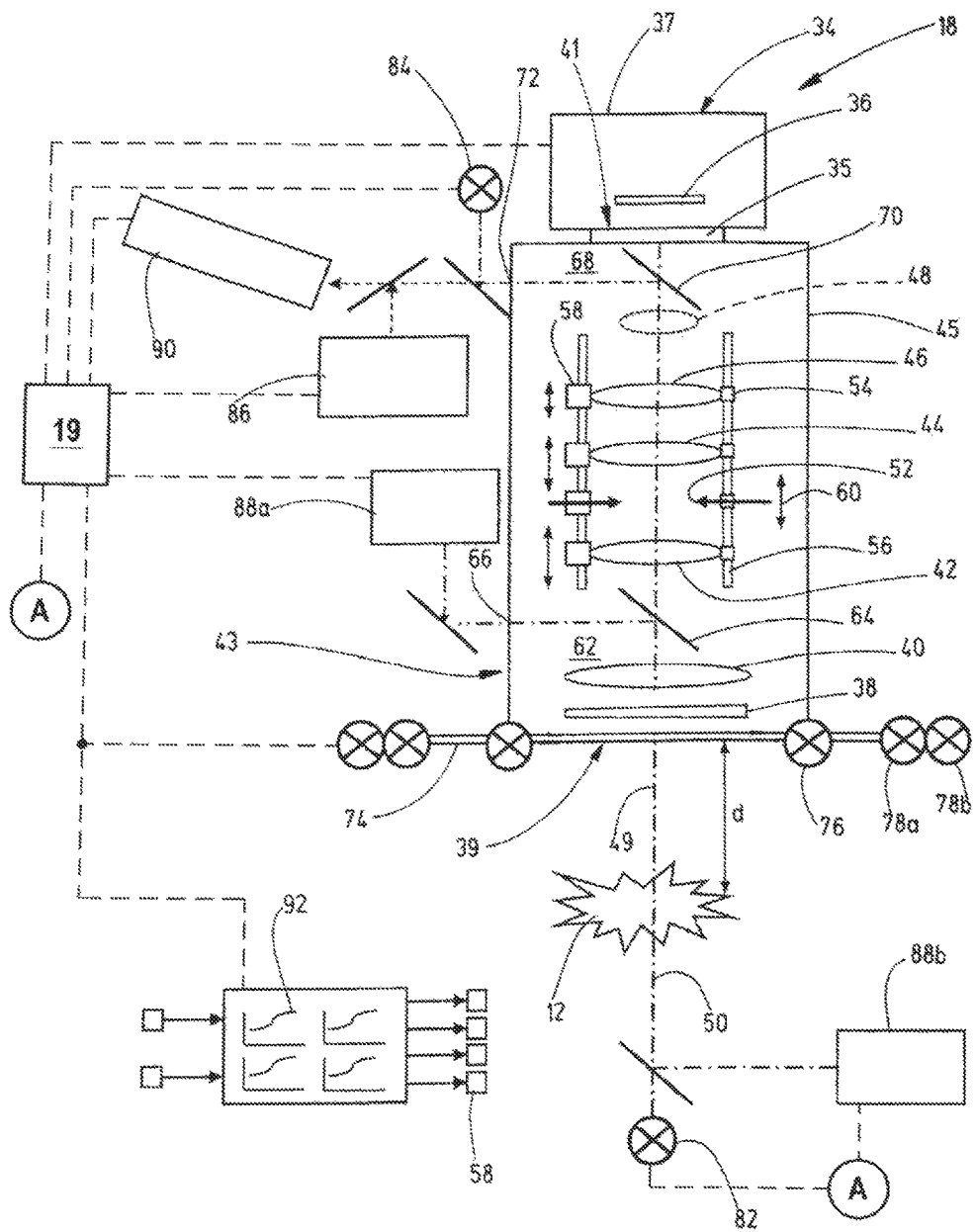
FIG. 3 shows a further embodiment of a measuring machine.

FIG. 3 shows an exemplary embodiment of the optical sensor 18, wherein, strictly, the optical sensor 18 in this exemplary embodiment contains a plurality of optical sensors which can optionally be present and used. The sensor 18 comprises a lens 43 with a lens body 45. Moreover, the lens 43 can be combined with further optical sensors, for example with a sensor measuring by way of deflectometry. In typical exemplary embodiments, the lens body 45 is a tube with a light entry opening 39 and a light exit opening 41, which are arranged at opposite ends of the tube. However, in principle, the lens body 45 can also have a form which deviates from a tube.

An interface 35 serving to connect a camera 34 is formed at the light exit opening 41. By way of example, the camera may have an image sensor 36. In preferred exemplary embodiments, the interface 35 is a standardized or widespread interface for coupling cameras and lenses, for example a so-called F-mount or a so-called C-mount. However, the interface 35 in some exemplary embodiments is a proprietary interface which, in particular, renders it possible to directly connect the housing 37 of the camera 34 to the lens body 45. In principle, use can also be made of other standardized or proprietary interfaces for connecting the camera 34 to the lens body 45.

A cover slip 38 is arranged in the lens body 45 or at the lens body 45 in the region of the light entry opening 39, which defines the distal end of the lens 43. In some exemplary embodiments, the cover slip 38 can have a screw top, which is screwed into a threaded mount at the distal end of the lens body 45. In other exemplary embodiments, the cover slip 38 can be inserted, clipped, adhesively bonded or connected in a stationary manner to the lens body 45 in any other way into a suitable recess on the lens body 45. In the preferred exemplary embodiments, the cover slip 38 is connected to the lens body 45 in such a way that a user of the coordinate measuring machine 10 can interchange the cover slip 38 without damaging the lens 43.

In the depicted exemplary embodiment, the cover slip 38 is a wedge-shaped glass plate, the thickness of which increases from one edge to the other edge, as depicted in the simplified sectional illustration of FIG. 2. In this case, the cover slip 38 has a wedge angle that is selected in such a way that a reflection at the front (toward the distal end of the lens 43) or rear side of the cover slip 38 does not reach the image sensor 36 of the camera 34. In the illustrated exemplary embodiment, the cover slip 38 is arranged in such a way that its front side lies at an angle, or obliquely, to the light entry opening 39, while the rear side likewise has a slightly oblique arrangement in relation thereto.

In other exemplary embodiments, a cover slip, with plane parallel front and rear sides, could be arranged at a slight angle to the image sensor 36 or the optical axis of the lens 43 that is explained in more detail below.

In further exemplary embodiments, the cover slip 38 can be realized in the form of a thin film which is clamped in the region of the light entry opening 39 of the lens 43. In some exemplary embodiments, the cover slip may be polarizing such that the light passing therethrough is polarized and/or the cover slip may contain a color filter for suppressing ambient light.

In the depicted exemplary embodiment of FIG. 3, a lens system with a first compound lens 40, a second compound lens 42, a third compound lens 44, and a fourth compound lens 46, is arranged between the cover slip 38 and the light exit opening 41 of the lens 43. In some exemplary embodiments, a fifth compound lens, which is depicted here using dashed lines, is arranged between the fourth compound lens 46 and the light exit opening 41. In the lens body 45, the compound lenses 40-48 are arranged in succession along a longitudinal axis 49 of the lens body 45 between the light entry opening 39 and the light exit opening 41. In the depicted exemplary embodiment, a light beam passing through the compound lenses 40-48 in the respective middle or center thereof does not experience any deflection, and so the longitudinal axis 49 coincides with an optical axis 50 of the lens 43.

A stop 52 is arranged between the second compound lens 42 and the third compound lens 44. In the preferred exemplary embodiments, the stop 52 is a diaphragm, i.e. a stop whose clear internal diameter can be varied.

The second, third, and fourth compound lenses 42, 44, 46 and the stop 52 are respectively coupled to a dedicated carriage 54, which can be moved along two guide rails 56. Further, the three compound lenses and the optical stop 52 are respectively coupled to an electric drive 58 in this exemplary embodiment. The second, third, and fourth compound lenses and the stop 52 can be displaced parallel to the optical axis 50 with the aid of the drives 58, as is indicated by way of the arrows 60. In contrast thereto, the first compound lens 40 and the optional fifth compound lens 48 are arranged in a stationary manner in the lens body 45 in the preferred exemplary embodiments.

As can be recognized in FIG. 3, a clear space 62 is present between the first compound lens 40 and the second compound lens 42 in some exemplary embodiments, said clear space remaining even if the second compound lens 42 was positioned with a minimum distance from the first compound lens 40. A beam splitter 64 can be arranged on the optical axis 50 in the clear space 62 in order to selectively couple or decouple light from a further interface 66 of the lens 43. In the preferred exemplary embodiments, the second interface 66 is arranged approximately level with the beam splitter 64 on the lateral circumference of the lens body 45.

Similarly, a further clear space 68, in which a beam splitter 70 has likewise been arranged, is present between the fourth compound lens 46 and the light exit opening 41 in some exemplary embodiments of the lens 43. A further interface 72, by means of which light can be coupled and/or decoupled, is level with the beam splitter 70. In the depicted exemplary embodiment, the beam splitter 70 is arranged between the fifth compound lens 48 and the light exit opening 41. As an alternative or in addition thereto, the beam splitter 70 could be arranged between the fourth compound lens 46 and the fifth compound lens 48, naturally assuming a corresponding clear space.

In preferred exemplary embodiments, the lens 43 has a holder 74 in the region of the light entry opening 39, with various light sources 76, 78 being arranged on said holder. In the depicted exemplary embodiment, the holder 74 carries a ring light with a multiplicity of light sources 78a, 78b, which are arranged around the lens body 45 at different radial distances. In some exemplary embodiments, the light sources 78a, 78b are able to produce differently colored light, for example white light, red light, green light, and blue light, as well as mixtures thereof. The light sources 78a, 78b can be used to produce different illumination scenarios at different distances from the light entry opening 39. In an exemplary manner, an object 12 to be measured is schematically indicated at the reference sign 12, said object to be measured being positioned at a distance d from the light entry opening 39 of the lens 43. The distance d represents a working distance between the lens 43 and the object 12 to be measured, with this working distance being variably adjustable on the basis of the focusing of the lens 43.

In the present exemplary embodiment, the light sources 76 are light sources which are integrated into the lens body 45. In some exemplary embodiments, the light sources 76 are integrated into the lens body 45 outside of the lens element system, as depicted in FIG. 3. In other exemplary embodiments, light sources 76 may (alternatively or additionally) be integrated into the lens body 45 in such a way that the light produced by the light sources 76 emerges out of the lens body 45 through at least some of the compound lenses and, optionally, the cover slip 38. In this case, the light entry opening 39 is simultaneously a light exit opening as well.

Using the light sources 76, 78 it is possible to provide variable illumination for the object 12 to be measured in order to selectively produce a bright field and/or a dark field illumination. In both cases, this is incident light which impinges on the object 12 to be measured from the direction of the lens 43.

Moreover, the coordinate measuring machine 10 may have a further light source 82 which facilitates transmitted light illumination of the object 12 to be measured. Accordingly, the light source 82 is arranged below the object 12 to be measured or below the workpiece receptacle of the coordinate measuring machine 10. Therefore, the coordinate measuring machine 10 has a workpiece receptacle 12 provided with a glass plate in the preferred exemplary embodiments in order to facilitate the transmitted light illumination.

Finally, a reflected light illumination device 84 is provided in these exemplary embodiments, said reflected light illumination device being able to be coupled to the interface 72 via a further beam splitter. Via the interface 72 and the beam splitter 70, the light source 84 can couple light into the entire beam path of the lens 43. Here, the coupled light is cast onto the object 12 to be measured via the lens element system comprising the first to fourth (fifth) compound lens.

In the same way, various illumination types can be coupled into the beam path of the lens 43 via the interface 66 and, in principle, via the light exit opening 41 as well. A lattice projector is depicted in an exemplary manner at the reference sign 86. The lattice projector produces a structured light pattern which, in this exemplary embodiment, is coupled into the beam path of the lens 43 via two beam splitters and the interface 72. In some exemplary embodiments, a light source can be a laser pointer, by means of which individual measurement points on the object 12 to be measured can be illuminated in a targeted manner. In other exemplary embodiments, a light source may produce a structured light pattern, such as a stripe pattern or a lattice pattern, which is projected onto the object 12 to be measured via the lens element system of the lens 43.

As depicted in FIG. 3, the lens 43 can be combined with optical sensors in various ways, said optical sensors, as an alternative or in addition to the camera 34, serving for the optical measurement of the object 12 to be measured. In FIG. 2, a first confocal white light sensor 88a is coupled to the interface 66 in a purely exemplary manner. Alternatively, or additionally, a confocal white light sensor 88b can be coupled into the illumination path for the transmitted light illumination 82 via e.g. a beam splitter. The sensors 88a and 88b can carry out point-by-point measurement.

The reference sign 90 denotes an autofocus sensor, with the aid of which the height of the object 12 to be measured parallel to the optical axis 50 can be ascertained on the basis of a determination of the focus position. Moreover, an optical measurement of the object 12 to be measured is possible with the aid of the camera 34 and a suitable image evaluation, as is known to the relevant persons skilled in the art in this field.

In the preferred exemplary embodiments, the lens 43 has a large area of application on account of the displaceable compound lenses 42, 44, 46 and the adjustable stop 52. In the preferred exemplary embodiments, a multiplicity of control curves 92 are stored in a memory of the control device 19 or in another suitable memory. In the preferred exemplary embodiments, the multiplicity of control curves 92 forms a 2D family of curves, with the aid of which the magnification and the focusing of the lens 43 can be set in numerous freely selectable combinations. In the depicted exemplary embodiment, a user can enter a desired magnification and desired focusing into the control device 19. With the aid of the control curves 92 and depending on the desired magnification and desired focusing, the control device 19 determines individual positions of the second compound lens, third compound lens, and fourth compound lens along the optical axis 50 and an individual position and aperture of the stop 52. In some exemplary embodiments of the novel method, the user can vary the working distance d to an object to be measured by varying the focusing, without the at least one sensor having to be moved relative to the object to be measured with the aid of the quill 14. By way of example, this renders it possible to measure structures at the surface of an object 12 to be measured and structures at the base of a bore (not depicted here) of the object 12 to be measured by virtue of only the focusing of the lens 43 being varied in the case of an unchanging magnification such that, in one case, the structure at the surface of the object 12 to be measured and, in the other case, the structure at the base of the bore lies in the focal plane of the lens 43.

In other variants, a user can vary the magnification of the lens 43 in the case of an unchanging or alternating working distance d, which denotes a distance between the object 12 to be measured and a first interference contour, namely the light entry opening 39 of the lens 43, for example to measure details anew of an object 12 to be measured that was measured previously "from a bird's eye perspective".

Moreover, in some exemplary embodiments, a user is able to modify the numerical aperture of the lens 43 by opening or closing the stop 52 in order, in this way, to obtain an unchanging resolution at different working distances d. Further, a user can vary the magnification, focusing, and numerical aperture individually or in combination in order to adapt the lens 43 in an ideal manner to the properties of the various sensors.

Figure 4:
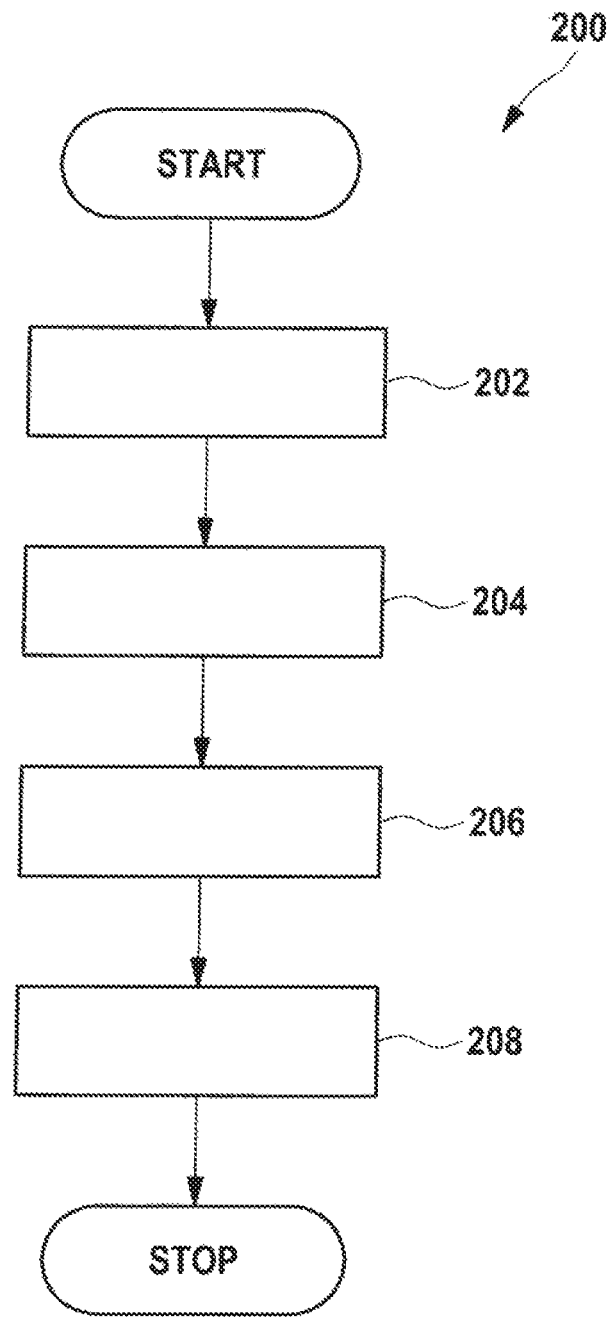
FIG. 4 shows a schematic flowchart of a method.

FIG. 4 shows a schematic flowchart of a method for controlling the illumination for the measuring machine 10 comprising at least one optical sensor 34 for recording an image in the image capturing region 80.

First, at least one image recording time period is set in a step 202, during which image recording time period an image recording is effectuated by means of the at least one optical sensor. As a consequence, a start of this image recording time period and the end thereof are known. If a plurality of image recording time periods are set, these are, in particular, set with a certain frequency. From this, a cycle duration accordingly emerges, i.e. a time duration between the start of two successive image recording time periods.

A control signal that presents the at least one image recording time period is provided in a step 204. By way of example, this can be provided as a digital signal which outputs the signal "1" during an image recording by the at least one optical sensor. It outputs the signal "0" outside of the image recording time period. In this way, the control device 19 always knows whether or not an image recording is effectuated. Now, the image capturing region 80 is illuminated 206 using a measurement illumination arrangement 96 of the measuring machine 10 during the image recording time period in a manner dependent on the control signal. By way of example, if the control signal is switched to "1", the measurement illumination arrangement is also switched on. If the control signal switches back again, the measurement illumination arrangement is switched off. In this manner, the measurement illumination arrangement is switched during the entire image capturing period to illuminate the image capturing region 80.

Moreover, there is a step 208 of illuminating the image capturing region with a further illumination arrangement, as explained above, for example by way of an ambient illumination arrangement or else a marking illumination device. This illumination 208 is effectuated temporally outside of the image recording time period. Here temporally outside means offset with regard to time, i.e. before and/or after the image recording time period. By way of example, when the control signal switches back again from "1" to "0", provision can be made for the at least one further illumination arrangement to be switched on. However, this need not necessarily be the case; as explained above, it is also possible to wait for a predetermined time duration before the at least one further illumination arrangement is switched on.

As already explained above, the at least one further illumination arrangement can be an ambient illumination arrangement. However, alternatively or cumulatively, this may also relate to a marking illumination device of the measuring machine 10. By way of example, a bright field reflected light illumination device 97 of the measuring machine can serve as a further illumination arrangement. However, provision can also be made of a laser or a different separate light source serving as a marking illumination device.

Figure 5A:
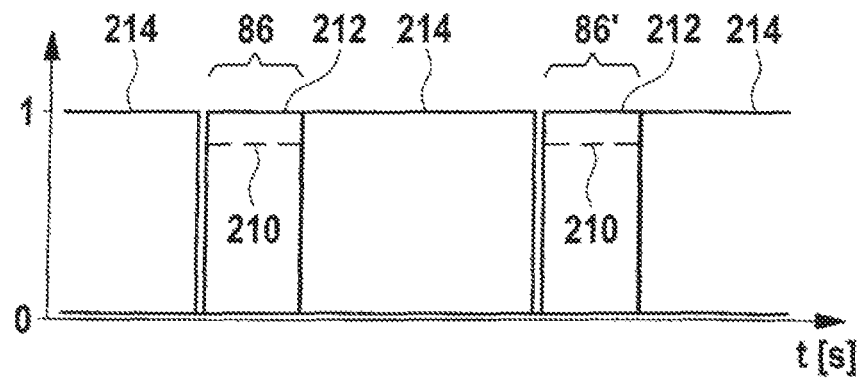
FIG. 5a shows a first timing diagram of the switching states in one embodiment.

FIG. 5a shows an exemplary embodiment of the method 200 in a timing diagram.

The control signal is denoted by reference sign 210. Moreover, a first image recording time period 86 and a second image recording time period 86' are depicted. As may be identified, the control signal 210 is set to a level unequal to zero during the image recording time periods 86, 86'. Outside of the image recording time periods 86, 86', it has a zero level. In this way, the control signal 210 can represent the image recording time periods 86, 86' particularly easily. Then, the measurement room illumination 96 is switched on the basis of e.g. the depicted line 212. Depending on the control signal 210, the measurement room illumination device is switched on during the image recording time periods 86, 86'; the corresponding signal 212 is at "1". As a consequence, it is brought in line with the control signal 210 in the present example. Naturally, this may, in principle, also be implemented conversely, for example such that the control signal is unequal to "0" outside of the image recording time periods 86 and "0" during the image recording time periods.

The further illumination arrangement is depicted along the line 214. It is switched in an inverted manner. This means that the further illumination arrangement is switched on temporally outside of the image recording time periods 86, 86'; the line 214 is at "1". When the control signal 210 jumps, there is also a switch of the further illumination arrangement 214 and the latter is switched off during the image recording time periods 86, 86'.

Figure 5B:
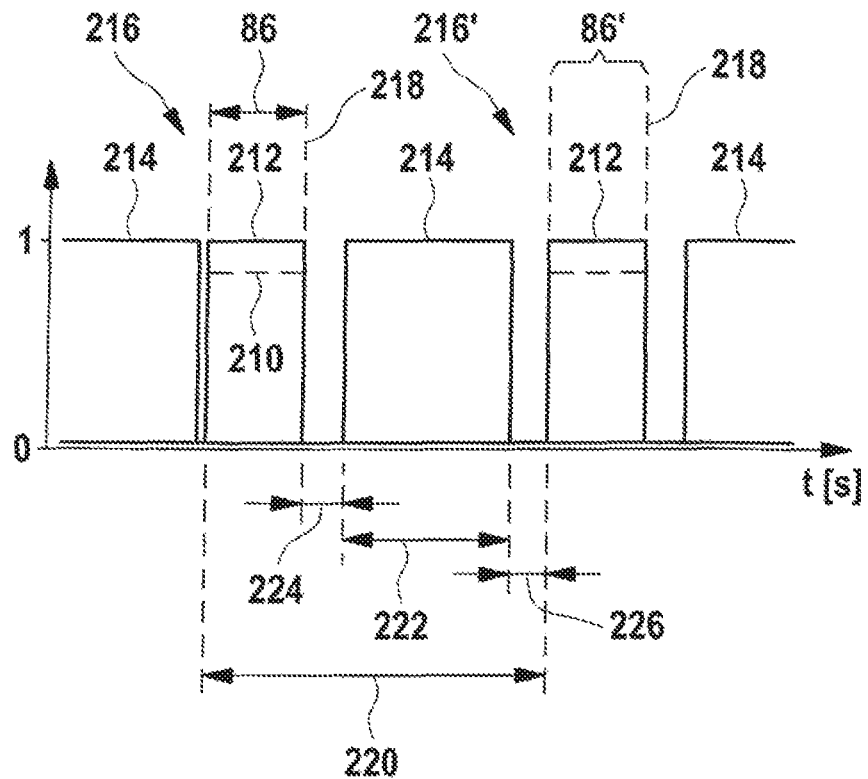
FIG. 5b shows a schematic illustration of the switching states in a further embodiment.

FIG. 5b shows a further configuration of the method. As a matter of principle, the same elements have been denoted by the same reference signs as in FIG. 5a and are not explained again.

In principle, if there is an arbitrary position and length of the image recording time periods 86, it may be the case that the time intervals lying therebetween become too short and there is an increased risk of a further illumination arrangement illuminating into an image recording time period 86, 86'. Therefore, use is made of the fact that, as a rule, an optical sensor, in particular a camera 34, operates at a fixed image recording frequency. In practice, 30 Hz are demanded, as a rule, for moving images; accordingly, 33.3 milliseconds then emerges for the cycle duration 220 thereof. From this, depending on the camera and the recording frequency thereof, the interval between the respective starts 216, 216' of successive image recording time periods 86, 86', namely precisely the cycle duration 220, is known.

In principle, the length of the image recording time period of the camera for an image can be selected as desired. However, cameras have, in particular, an image recording time period of approximately 5 milliseconds for the exposure. From this, the temporal length of the image recording time period 86, 86' emerges. As a consequence, the positions of the respective ends of the image capturing time periods

86, 86' now are known. Consequently, it may then be e.g. fixedly configured that a first time duration 224 is allowed to elapse after a change in control signal has occurred before the further illumination arrangement 214 is switched on. By way of example, this first time duration 224 can be set to 1 millisecond. In this way, illuminating into the image capturing region 86, 86' can be reliably avoided. By knowing the cycle duration 120, the duration of the image recording time period 86, 86', and the first time duration 24, the length of the time span that is available for an illumination by means of the further illumination arrangement is now known. A length of the illumination time period, which is denoted by 222, by the further illumination arrangement can therefore be set dependent on the cycle duration. Then, a second time duration 226 emerges therefrom, said time duration specifying the offset with which the further illumination arrangement ends prior to the start of the next illumination time period 86'. Expressed differently, proceeding from the start of an image recording time period 86, the end of the illumination time period 222 by means of the further illumination arrangement therefore emerges from the sum of the length of the image recording time period 86, the first time duration 24, and the length of the illumination time period by means of the further illumination arrangement 222. This sum is always less than the cycle duration 220.

In particular, depending on the cycle duration, provision can be made for the image recording time period to be less than 20% of the cycle duration. Moreover, provision can be made for the switch on time period 222 of the further illumination arrangement outside of the image recording time period to be less than 67% of the length of the cycle duration.

Superimposed on the settings mentioned above, provision can of course continue to be made for a further illumination arrangement to be switched off in any case when an image recording takes place, i.e. when the control signal 210 jumps from "0" to "1" for whatever reason. Moreover, e.g. a rule may be provided as to how an end captures an image recording sequence. By way of example, provision can be made for the at least one further illumination device to be switched on again when more than the length of a cycle duration 220 has elapsed since the control signal jumped from "1" to "0" as the assumption can be made that an image recording sequence has been completed. The further illumination arrangement can remain permanently switched on until another change in the control signal 210 occurs.

As a consequence, immediate switching off of the further illumination arrangement at the start of the image recording time period 86 then is also provided at the first image recording time period 86, as may be gathered from FIG. 5*b*. However, in all following image recording time periods 86', a timely switch off, offset by the time duration 226, would be provided and a persistence of the further illumination arrangement into the image recording is reliably avoided.

The invention claimed is:

1. A coordinate measuring machine comprising at least one optical sensor for image recording in an image capturing region during an image recording time period for inspecting a measurement object, a control signal transducer which provides a control signal that represents the image recording time period, a measurement illumination arrangement for illuminating the image capturing region, and a control device, wherein the control device is embodied to switch on the measurement illumination arrangement only during the image recording time period in a manner dependent on the control signal, and wherein the control device moreover is embodied to switch on at least one further illumination arrangement only temporally outside the image recording time period in a manner dependent on the control signal, wherein the measuring machine has the further illumination arrangement, wherein the further illumination arrangement is a marking illumination device for marking the image capturing region, wherein the coordinate measuring machine has a lens, and wherein an image recording of the at least one optical sensor is effected through the lens, wherein the lens is a zoom lens, wherein a measurement illumination beam path of the measurement illumination arrangement extends through the entire lens, wherein the marking illumination device is a laser, and wherein the laser is arranged in such a way that a marking beam path of the laser extends outside the lens.

2. The coordinate measuring machine as claimed in claim 1, wherein exactly one optical sensor is provided, wherein the optical sensor is a camera.

3. A method for controlling an illumination for a coordinate measuring machine comprising at least one optical sensor for image recording in an image capturing region for inspecting a measurement object, comprising the following steps:
  setting at least one image recording time period, during which an image recording is effected by means of the at least one optical sensor;
  providing a control signal that represents the at least one image recording time period;
  illuminating the image capturing region by means of a measurement illumination arrangement of the coordinate measuring machine through a lens of the coordinate measuring machine only during the image recording time period in a manner dependent on the control signal; and
  illuminating the image capturing region by means of at least one further illumination arrangement only temporally outside the image recording time period in a manner dependent on the control signal, wherein the further illumination arrangement is a marking illumination device for marking the image capturing region, wherein the marking illumination device is a laser, and wherein the laser is arranged in such a way that a marking beam path of the laser extends outside the lens;
  wherein the illuminating by means of the at least one further illumination arrangement starts offset by a first time duration after an end of the at least one image recording time period, wherein the illuminating by means of the at least one further illumination arrangement ends offset by a second time duration before a start of the at least one image recording time period, wherein a plurality of image recording time periods are set, wherein the respective starts of successive image recording time periods are spaced apart from one another in time by one cycle duration, wherein the length of the image recording time period is less than 20% of the cycle duration, wherein a length of a switch-on time period of the further illumination arrangement outside the image recording time period is less than 67% of the length of the cycle duration.

4. The method as claimed in claim 3, wherein the first and/or the second time duration have/has a length of at least 0.5 ms and at most 2 ms.

5. A non-transitory computer readable storage medium encoded with a computer program which, when executed by a computer processor of a coordinate measuring machine having at least one optical sensor for recording an image of a measurement object in an image capturing region, performs the steps of:
- setting at least one image recording time period, during which an image recording is effected by means of the at least one optical sensor;
- providing a control signal that represents the at least one image recording time period;
- illuminating the image capturing region by means of a measurement illumination arrangement of the coordinate measuring machine through a lens of the coordinate measuring machine only during the image recording time period in a manner dependent on the control signal; and
- illuminating the image capturing region by means of at least one further illumination arrangement only temporally outside the image recording time period in a manner dependent on the control signal, wherein the further illumination arrangement is a marking illumination device for marking the image capturing region, wherein the marking illumination device is a laser, and wherein the laser is arranged in such a way that a marking beam path of the laser extends outside the lens;
- wherein the illuminating by means of the at least one further illumination arrangement starts offset by a first time duration after an end of the at least one image recording time period, wherein the illuminating by means of the at least one further illumination arrangement ends offset by a second time duration before a start of the at least one image recording time period, wherein a plurality of image recording time periods are set, wherein the respective starts of successive image recording time periods are spaced apart from one another in time by one cycle duration, wherein the length of the image recording time period is less than 20% of the cycle duration, wherein a length of a switch-on time period of the further illumination arrangement outside the image recording time period is less than 67% of the length of the cycle duration.

* * * * *